United States Patent
Sumihiro

(10) Patent No.: US 7,111,098 B2
(45) Date of Patent: Sep. 19, 2006

(54) INFORMATION PROCESSING APPARATUS, INFORMATION PROCESSING METHOD, RECORDING MEDIUM AND PROGRAM

(75) Inventor: Hiroshi Sumihiro, Kanagawa (JP)

(73) Assignee: Sony Corporation, (JP)

( * ) Notice: Subject to any disclaimer, the term of this patent is extended or adjusted under 35 U.S.C. 154(b) by 111 days.

(21) Appl. No.: 10/663,422

(22) Filed: Sep. 16, 2003

(65) Prior Publication Data

US 2004/0064617 A1    Apr. 1, 2004

(30) Foreign Application Priority Data

Oct. 1, 2002    (JP)    ............................. P2002-289022

(51) Int. Cl.
*G06F 13/362*    (2006.01)
*G06F 13/18*    (2006.01)
*G06F 13/368*    (2006.01)

(52) U.S. Cl. .................... 710/116; 710/111; 710/241; 710/244

(58) Field of Classification Search ................ 710/107, 710/111, 113, 116, 118, 241, 244, 264
See application file for complete search history.

(56) References Cited

U.S. PATENT DOCUMENTS

| | | | | |
|---|---|---|---|---|
| 4,682,282 A | * | 7/1987 | Beasley ...................... | 710/244 |
| 5,392,033 A | * | 2/1995 | Oman et al. .............. | 340/825.5 |
| 5,519,837 A | * | 5/1996 | Tran ........................... | 710/111 |
| 5,572,686 A | * | 11/1996 | Nunziata et al. ............ | 710/116 |
| 5,778,200 A | * | 7/1998 | Gulick ........................ | 710/113 |
| 5,956,493 A | * | 9/1999 | Hewitt et al. ............... | 710/113 |
| 6,226,702 B1 | * | 5/2001 | Yakashiro ................... | 710/107 |
| 6,240,475 B1 | * | 5/2001 | Anubolu ..................... | 710/107 |
| 6,510,489 B1 | * | 1/2003 | Komoto ....................... | 711/106 |
| 6,704,821 B1 | * | 3/2004 | Scandurra et al. .......... | 710/243 |
| 6,880,028 B1 | * | 4/2005 | Kurth ......................... | 710/240 |
| 7,028,121 B1 | * | 4/2006 | Chae .......................... | 710/240 |
| 7,062,582 B1 | * | 6/2006 | Chowdhuri ................. | 710/116 |
| 2003/0191880 A1 | * | 10/2003 | Lin ............................ | 710/116 |

OTHER PUBLICATIONS

Tanenbaum, Andrew S.; "Structured Computer Organization"; Prentice-Hall, Inc.; 1990; Third Edition; pp. 11-13.*

* cited by examiner

*Primary Examiner*—Paul R. Myers
*Assistant Examiner*—Ryan Stiglic
(74) *Attorney, Agent, or Firm*—Lerner, David, Littenberg, Krumholz & Mentlik, LLP

(57) ABSTRACT

A bus arbitration system employs counters respectively provided for an encoding section and an decoding section that are started when there is a request signal from the respective encoding section and decoding section. The counter values are outputted to respective comparators that compare the counter values with predetermined values and the results of the comparisons are fed to an arbitration controller. The arbitration controller in turn determines priority rankings for the encoding section and the decoding section based on the signals inputted from the comparators and outputs an acknowledgement signal to the module that has the highest priority.

8 Claims, 14 Drawing Sheets

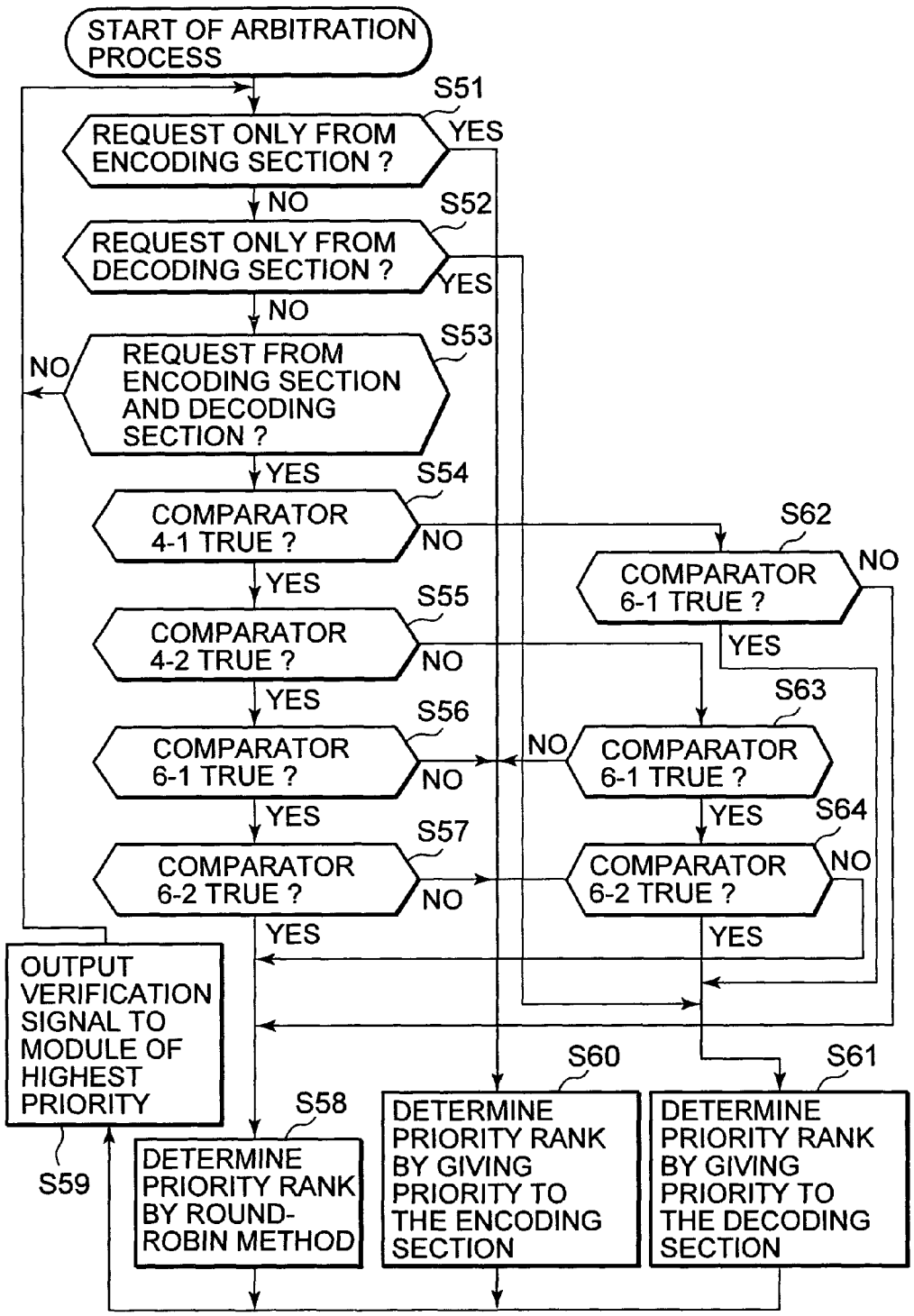

FIG. 9

|  | ENCODING SECTION (M0) | | DECODING SECTION (M1) | |
| --- | --- | --- | --- | --- |
|  | Comp4-1 | Comp4-2 | Comp6-1 | Comp6-2 |
| R(M0,M1) | 0 | 0 | 0 | 0 |
|  | 1 | 0 | 1 | 0 |
|  | 1 | 1 | 1 | 1 |
| M0,M1 | 1 | 0 | 0 | 0 |
|  | 1 | 1 | 0 | 0 |
|  | 1 | 1 | 1 | 0 |
| M1,M0 | 1 | 0 | 1 | 1 |
|  | 0 | 0 | 1 | 1 |
|  | 0 | 0 | 1 | 0 |

FIG. 11

| | M0 | | | M1 | | | M2 | | |
|---|---|---|---|---|---|---|---|---|---|
| | Comp107-1 | Comp107-2 | Comp107-3 | Comp108-1 | Comp108-2 | Comp108-3 | Comp109-1 | Comp109-2 | Comp109-3 |
| R(M0,M1,M2) | 0 | 0 | 0 | 0 | 0 | 0 | 0 | 0 | 0 |
| | 1 | 1 | 1 | 1 | 1 | 1 | 1 | 1 | 1 |
| | 1 | 1 | 0 | 1 | 1 | 0 | 1 | 1 | 0 |
| M0,R(M1,M2) | 1 | 0 | 0 | 0 | 0 | 0 | 0 | 0 | 0 |
| | 1 | 1 | 0 | 0 | 0 | 0 | 1 | 0 | 0 |
| | 1 | 1 | 1 | 1 | 0 | 0 | 1 | 0 | 0 |
| | 1 | 1 | 1 | 1 | 1 | 1 | 1 | 1 | 1 |
| R(M1,M2)M0 | 0 | 0 | 0 | 1 | 1 | 0 | 0 | 0 | 0 |
| | 0 | 0 | 0 | 1 | 1 | 1 | 0 | 0 | 0 |
| | 0 | 0 | 0 | 1 | 0 | 0 | 1 | 1 | 1 |
| | 1 | 1 | 0 | 1 | 1 | 0 | 1 | 1 | 1 |
| M0,M1,M2 | 1 | 1 | 1 | 1 | 1 | 1 | 0 | 0 | 0 |
| | 1 | 1 | 0 | 0 | 0 | 0 | 0 | 0 | 0 |
| M0,M2,M1 | 1 | 1 | 1 | 0 | 0 | 0 | 1 | 0 | 0 |
| | 1 | 1 | 1 | 1 | 0 | 0 | 1 | 1 | 0 |

FIG. 12

| | M0 | | | M1 | | | M2 | | |
|---|---|---|---|---|---|---|---|---|---|
| | Comp107-1 | Comp107-2 | Comp107-3 | Comp108-1 | Comp108-2 | Comp108-3 | Comp109-1 | Comp109-2 | Comp109-3 |
| M1,R(M0,M2) | 0 | 0 | 0 | 1 | 0 | 0 | 0 | 0 | 0 |
| | 1 | 0 | 0 | 1 | 1 | 0 | 0 | 0 | 0 |
| | 0 | 0 | 0 | 1 | 1 | 1 | 1 | 0 | 0 |
| | 1 | 0 | 0 | 1 | 1 | 0 | 1 | 0 | 0 |
| R(M0,M2),M1 | 1 | 1 | 0 | 1 | 0 | 0 | 1 | 1 | 0 |
| | 1 | 0 | 1 | 1 | 0 | 0 | 1 | 1 | 1 |
| | 1 | 1 | 0 | 1 | 0 | 0 | 1 | 1 | 1 |
| | 1 | 1 | 1 | 1 | 1 | 0 | 1 | 1 | 0 |
| M1,M0,M2 | 1 | 1 | 0 | 1 | 1 | 1 | 0 | 0 | 1 |
| | 1 | 0 | 0 | 1 | 1 | 1 | 0 | 0 | 0 |
| | 1 | 1 | 0 | 1 | 1 | 1 | 1 | 0 | 0 |
| M1,M2,M0 | 0 | 0 | 0 | 1 | 1 | 1 | 1 | 1 | 0 |
| | 0 | 0 | 0 | 1 | 1 | 1 | 1 | 0 | 0 |
| | 1 | 0 | 0 | 1 | 1 | 1 | 1 | 1 | 0 |

FIG. 13

| | M0 | | | M1 | | | M2 | | |
|---|---|---|---|---|---|---|---|---|---|
| | Comp107-1 | Comp107-2 | Comp107-3 | Comp108-1 | Comp108-2 | Comp108-3 | Comp109-1 | Comp109-2 | Comp109-3 |
| M2,R(M0,M1) | 0 | 0 | 0 | 1 | 0 | 0 | 1 | 0 | 0 |
| | 0 | 0 | 0 | 1 | 0 | 0 | 1 | 1 | 0 |
| | 1 | 0 | 0 | 0 | 0 | 0 | 1 | 1 | 1 |
| | 0 | 0 | 0 | 1 | 1 | 0 | 1 | 1 | 0 |
| R(M0,M1),M2 | 1 | 1 | 0 | 1 | 0 | 1 | 0 | 0 | 0 |
| | 1 | 1 | 1 | 1 | 1 | 1 | 0 | 0 | 0 |
| | 1 | 1 | 1 | 1 | 1 | 0 | 1 | 0 | 0 |
| | 1 | 1 | 1 | 1 | 1 | 1 | 1 | 1 | 1 |
| M2,M0,M1 | 1 | 1 | 0 | 0 | 0 | 0 | 1 | 1 | 0 |
| | 1 | 0 | 0 | 0 | 0 | 0 | 1 | 1 | 0 |
| | 1 | 1 | 0 | 1 | 0 | 0 | 1 | 1 | 1 |
| M2,M1,M0 | 0 | 0 | 0 | 1 | 1 | 0 | 1 | 1 | 0 |
| | 0 | 0 | 0 | 1 | 1 | 0 | 1 | 1 | 1 |
| | 1 | 0 | 0 | 1 | 1 | 0 | 1 | 1 | 0 |
| | 0 | 0 | 0 | 1 | 1 | 0 | 1 | 1 | 1 |

INFORMATION PROCESSING APPARATUS, INFORMATION PROCESSING METHOD, RECORDING MEDIUM AND PROGRAM

CROSS REFERENCE TO RELATED APPLICATIONS

The present document is based on Japanese Priority Application JP2002-289022, filed in the Japanese Patent Office on Oct. 1, 2002, the contents of which being incorporated herein by reference to the extent permitted by law.

BACKGROUND OF THE INVENTION

1. Field of the Invention

The present invention relates to an information processing apparatus, an information processing method, a recording medium and a program, and, more particularly, relates to an information processing apparatus and an information processing method, which carry out an arbitration for efficient acquisition of a bus by a plurality of modules when the plurality of modules carry out process using a single bus.

2. Related Art

Nowadays, electronic apparatuses and devices that are controlled by LSI's (Large Scale Integration) circuits have become popular.

In LSI's, various processes are carried out by modules (engines) including a plurality of IC's (Integrated Circuits). In such case, in order to have the process of each module of the LSI to be executed, it is required to store data in an external memory according to the process being performed, or to conveniently read out the stored data.

For this reason, the order of acquisition of a bus connected to the external memory for each module is arbitrated, in other words, a function is provided for controlling bus arbitration so that the bus acquisition is controlled for each module.

Available methods for bus arbitration include a round-robin method, a fixed priority method (a fixed priority rank method) and the like.

The round-robin method is a method in which the bus is uniformly acquired by a plurality of modules, i.e., it is a method of controlling by making the plurality of modules acquire the bus in sequence.

FIG. 1A and FIG. 1B show an example of a timing chart in which the timings when two modules of a first module and a second module acquire one bus are controlled in accordance with a round-robin method.

Here, FIG. 1A shows the timing when the first module transmits a request signal for requesting the acquisition of the bus and the timing when the bus is acquired to then execute a first process, and FIG. 1B shows the timing when the second module transmits the request signal for requesting the acquisition of the bus and the timing when the bus is acquired to then execute a second process.

The first module transmits a request signal R1 for requesting the acquisition of the bus at a time t1, and when acquiring the bus between the times t1 and t2, executes a first process 1 (in FIG. 1A, it is indicated by the encircled numeral "1", and hereafter, an encircled numeral indicates a process in the drawing), and then transmits a request signal R2 at a time t2 of a timing when the process is ended. At this event, the round-robin method carries out the control so that the first module and the second module alternately acquire the bus. Thus, until the second module completes a second process 11, the first module cannot acquire the bus. So, a next first process 2 is not executed, staying in a standby mode.

Here, at a time t3, the second module transmits a request signal R11 and at that timing, the second module acquires the bus, and executes the second process 11 between the times t3 and t4.

At the time t4 when this second process 11 is ended, the first module can acquire the bus, thus executing the first process 2 between the times t4 and t5, and further transmitting a request signal R3 for requesting the acquisition of the bus at the time t5 when the first process 2 is ended.

Also at this time, in the round-robin method, the first module cannot acquire the bus until the completion of the process of the second module.

Under this condition, at a time t6, the second module can acquire the bus at that timing, if transmitting a request signal R12 for the bus acquisition, thus, executing a second process 12 between the times t6 and t7.

At the time t7 when this process 12 is ended, the first module can acquire the bus, thus executing a first process 3 between the times t7 and t8, and further transmitting a request signal R4 for requesting the acquisition of the bus at a time t8.

Also at that time, in the round-robin method, the first module cannot acquire the bus until the completion of the process of the second module.

Under this condition, at a time t9, the second module, if transmitting a request signal R13 for the bus acquisition, can acquire the bus at that timing, thus executing a second process 13 between the times t9 and t10 and further transmitting a request signal R14 for requesting the acquisition of the bus at that timing. At this time, in the round-robin method, the second module cannot acquire the bus until the completion of the process of the first module.

On the other hand, at the time t10 that is the timing when this second process 13 is executed, the first module can acquire the bus, thus executing a first process 4 between the times t10 and t11. At this time, the request for the bus acquisition is not transmitted.

At the time t11 when this first process 4 is ended, the second module can acquire the bus, thus executing a second process 14 between the times t11 and t12 and further transmitting a request signal R15 for requesting the bus acquisition at the time t12. Also at this time, in the round-robin method, the second module cannot acquire the bus until the completion of the process of the first module.

Under this condition, at a time t13, the first module, if transmitting a request signal R5 for requesting the bus acquisition, can acquire the bus at that timing, thus executing a first process 5 between the times t13 and t14.

At the time t14 when this first process 5 is ended, the second module can acquire the bus, thus executing a second process 15 between the times t14 and t15 and further transmitting a request signal R16 for requesting the bus acquisition at the time t15. Also at this time, in the round-robin method, the second module cannot acquire the bus until the completion of the process of the first module.

Under this condition, at a time t16, the first module, if transmitting a request signal R6 for requesting the bus acquisition, can acquire the bus at that timing, thus executing a first process 6 between the times t16 and t17.

At the time t17 when this first process 6 is ended, the second module can acquire the bus, thus executing a first process 16 between the times t17 and t18.

As mentioned above, the round-robin method is the method in which the first module and the second module alternately acquire the bus and carry out their processes.

Also, a fixed priority method (a fixed priority rank method) is a method in which if there are a plurality of modules, a priority rank is set in advance for each module, and a bus is acquired in accordance with the priority rank, if a request for requesting a bus acquisition is carried out from each module.

Also, among conventional arbitration apparatuses, there is an apparatus in which when one common resource is used between a plurality of masters, a priority rank is calculated to thereby set a grant to use the common source in accordance with the calculation result. For example, refer to Japanese Laid Open Patent Application JP-A 2002-55944 (Paragraph [0058] and FIG. 3 and FIG. 4).

By the way, as shown in FIGS. 1A, 1B as mentioned above, the frequency of accesses to an external memory of each module is typically changed on the basis of the processing conditions.

However, in FIG. 1A and FIG. 1B, for example, at the times t2, t3 and t4, the first module transmits the request signals R2, R3 and R4 for requesting the bus acquisitions. On the contrary, although the second module does not request the bus acquisition, the processes have to wait until the times t4, t7 and t10 that are the timings when the processes of the second module are ended. Also at the times t12 and t15, the second module transmits the requests R15, R16 for the bus acquisition. On the contrary, although the first module does not request the bus acquisition, the processes have to wait until the times t14 and t17 that are the timings when the processes of the first module are ended. As a result, it is not possible to attain an efficient bus arbitration process (the process for adjusting the bus acquisition), which results in the generation of unnecessary latency time. Hence, this brings about a problem that the processing speed is reduced for LSI as a whole.

Also, in the case of the fixed priority rank method, if there are many modules, a module having a higher priority rank can preferentially acquire the bus and execute the processes. However, a module having a lower priority rank cannot acquire the bus as long as the process having the higher priority rank continues to be executed. Thus, there may be a fear that a proper bus cannot be acquired when the process condition for each module is changed. This results in a problem that the processing speed is reduced.

SUMMARY OF THE INVENTION

The present invention has been conceived in view of the above mentioned circumstances and, accordingly, an appropriate bus arbitration process that changes priority rank has been proposed.

An information processing apparatus according to a preferred embodiment of the present invention includes a plurality of receiving means for receiving a request signal for requesting bus acquisition for each of a plurality of modules; measurement means for measuring time limit of each of the plurality of modules based on the request signal received by each of the plurality of receiving means; priority determination means for determining priority of bus acquisition of the plurality of modules according to the time limit measured by the measurement means; and control means for controlling acquisition of bus for the plurality of modules based on the priority determined by the priority determination means.

It is preferable that the information processing apparatus has said priority determination means determining priority by means of a round-robin method if there is a plurality of modules having a same time limit as measured by said measurement means.

An information processing method according to another preferred embodiment of the present invention includes the steps of: receiving a request signal for requesting bus acquisition for each of a plurality of modules; measuring time limit of each of the plurality of modules based on a request signal received for each of a plurality of modules, for requesting bus acquisition; determining priority of bus acquisition of the plurality of modules according to a time limit as measured in the measurement step; and controlling acquisition of bus for the plurality of modules based on the priority as determined in the priority determination step.

According to still another preferred embodiment of the present invention, there is provided a storage medium for storing a computer-readable program comprising the steps of: measuring time limit of each of the plurality of modules based on a request signal received for each of a plurality of modules, for requesting bus acquisition; determining priority of bus acquisition of the plurality of modules according to a time limit as measured in the measurement step; and controlling acquisition of bus for the plurality of modules based on the priority as determined in the priority determination step.

According to still another preferred embodiment of the present invention, there is provided a computer-readable program comprising the steps of: measuring time limit of each of the plurality of modules based on a request signal received for each of a plurality of modules, for requesting bus acquisition; determining priority of bus acquisition of the plurality of modules according to a time limit as measured in the measurement step; and controlling acquisition of bus for the plurality of modules based on the priority as determined in the priority determination step.

According to the preferred embodiments of the present invention, it is possible to realize efficient bus arbitration (i.e., a process of arbitrating bus acquisition) by setting appropriate priority ranks.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which:

FIG. 7 is a flowchart describing an arbitration process according to an example of the preferred embodiment of the present invention;

FIG. 9 is a schematic view showing a relationship between an output signal pattern of the comparator of FIG. 2 and the priority rank;

FIG. 11 is a schematic view showing a relationship between an output signal pattern of the comparator of FIG. 10 and the priority rank;

FIG. 12 is a schematic view showing a relationship between an output signal pattern of the comparator of FIG. 10 and the priority rank;

FIG. 13 is a schematic view showing a relationship between an output signal pattern of the comparator of FIG. 10 and the priority rank.

DESCRIPTION OF THE PREFERRED EMBODIMENTS OF THE PRESENT INVENTION

Figure 2:
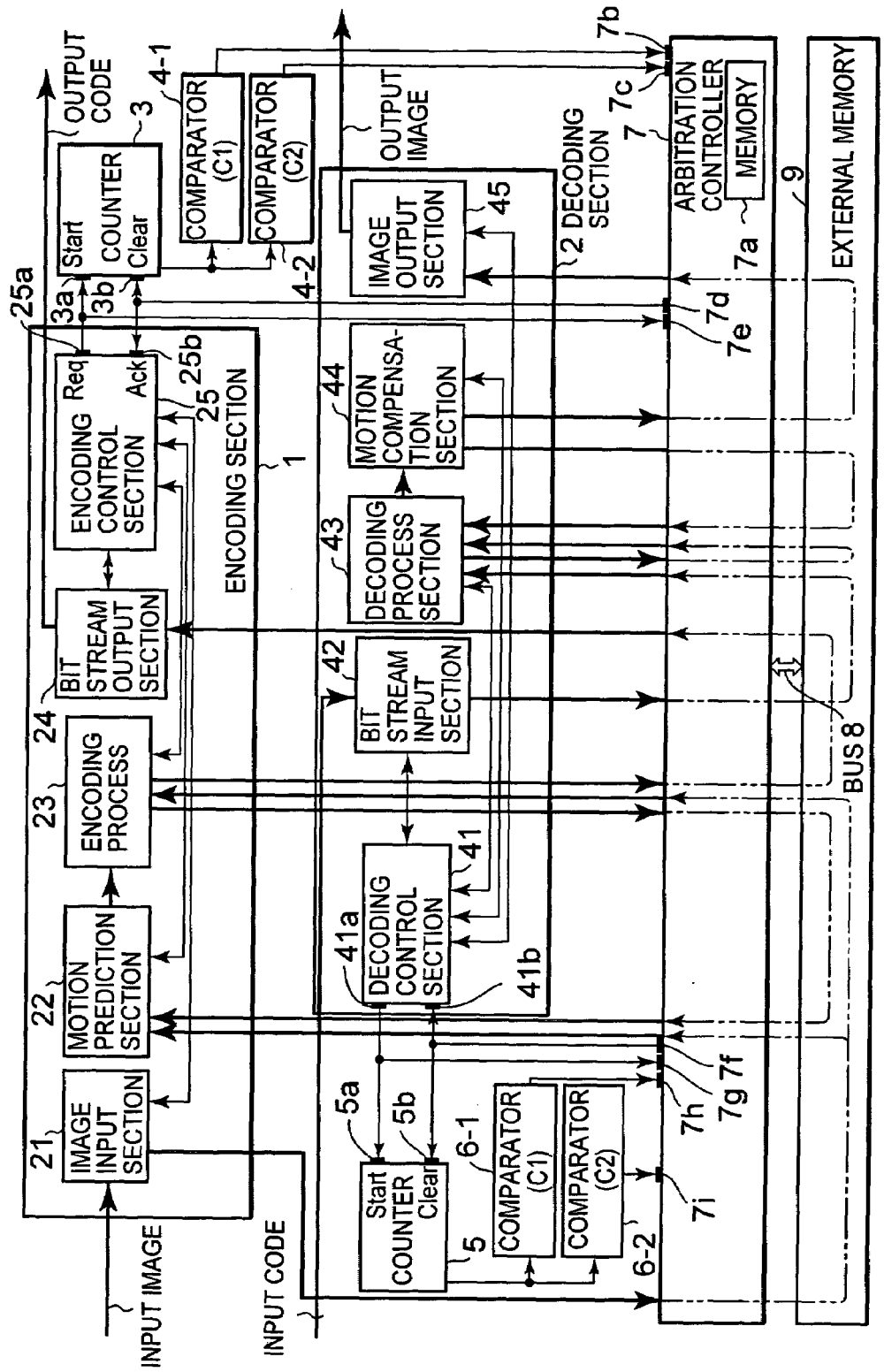
FIG. 2 is a schematic block diagram describing a configuration of a LSI according to a preferred embodiment of the present invention.

FIG. 2 is a view showing a configuration of an embodiment of LSI according to according to a preferred embodiment of the present invention.

In the LSI according to the present embodiment, it is possible to simultaneously execute the processes of encoding and outputting an input image in accordance with an MPEG method and as well as decoding an inputted encoded signal according to the MPEG method and outputting the processed signal as image.

At first, the configuration of an encoding section 1 is described. The encoding section 1 encodes an input image and outputs as an encoded signal.

An image input section 21 of the encoding section 1 converts the input image into spatial resolution that is used in encoding, and rearranges a screen correspondingly to each of picture types for an I-picture (an intra image), a P-picture (a forward prediction image) and a B-picture (a forward backward prediction image) and then outputs to a motion prediction section 22 and an encoding processor 23. In detail, once the image input section 21 outputs to an external memory 9 through a bus 8 for each picture type and stores in it, this is read out by the motion prediction section 22 and the encoding processor 23. At this event, the image input section 21 requests an encoding controlling section 25 to acquire the bus 8. In response to this request, the image input section 21, if receiving a report of an acknowledgement indicative of the acquisition of the bus 8 from the encoding controlling section 25, instructs the external memory 9 to execute a predetermined process via the bus 8.

The motion prediction section 22 determines the difference between the image inputted as the picture type of the B-picture or the P-picture and the I-picture or the P-picture serving as that standard, and determines a motion vector, and then outputs to the encoding processor 23. In detail, the motion prediction section 22 reads out the I-picture or the P-picture having the correlation with the image stored as the input image in the external memory 9, and compares and determines the motion vector and stores in the external memory 9 so that the encoding processor 23 can read out it. At this time, the motion prediction section 22 requests the encoding controlling section 25 to acquire the bus 8. In response to this request, the motion prediction section 22, if receiving the report of the acknowledgement indicative of the acquisition of the bus 8 from the encoding controlling section 25, instructs the external memory 9 to execute a predetermined process via the bus 8.

The encoding processor 23 generates an encoding signal based on the picture type and outputs to a bit stream output section 24 based on the input image inputted from the image input section 21 and the motion vector inputted from the motion prediction section 22. More specifically, it uses the input image, which is stored in the external memory 9 and inputted from the image input section 21, and the motion vector generated by the motion prediction section 22, and in the case of the I-picture, it encodes the picture serving as the input image in its original state, and in the case of the P-picture or the B-picture, it encodes that motion vector, and thereby generates the encoding signal and then stores in the external memory 9 as the information that can be read out by the bit stream output section 24. At this time, the encoding processor 23 requests the encoding controlling section 25 to acquire the bus 8. In response to this request, the encoding processor 23, if receiving the report of the acknowledgement indicative of the acquisition of the bus 8 from the encoding controlling section 25, instructs the external memory 9 to execute the predetermined process via the bus 8.

The bit stream output section 24 reads out from the external memory 9 the encoding signal encoded by the encoding processor 23, and outputs the encoded output signal as a bit stream. At this time, the bit stream output section 24 requests the encoding controlling section 25 to acquire the bus 8. In response to this request, the bit stream output section 24, if receiving the report of the acknowledgement indicative of the acquisition of the bus 8 from the encoding controlling section 25, instructs the external memory 9 to execute the predetermined process via the bus 8.

The encoding controlling section 25 controls the entire operation of the encoding section 1 and when the image input section 21, the motion prediction section 22, the encoding processor 23 or the bit stream output section 24 requests to acquire the bus 8, outputs a request signal (Request) for requesting a bus acquisition from a terminal 25*a* to a terminal 3*a* of a counter 3 and a terminal 7*e* of an arbitration controller 7. In addition, if the acquisition of the bus 8 is admitted in response to this request signal, it receives an acknowledgement signal (Acknowledge) transmitted from a terminal 7*d* of the arbitration controller 7 at a terminal 25*b*. Also, upon receipt of this acknowledgement signal, it outputs a report indicative of the acquisition of the bus 8 to the image input section 21, the motion prediction section 22, the encoding processor 23 or the bit stream output section 24, and instructs to execute the various processes.

The counter 3, upon receiving the request signal for requesting the acquisition of the bus 8 inputted from the encoding section 1 from the terminal 3*a*, counts values at a predetermined temporal interval and outputs that count value Z1 to comparators 4-1, 4-2. Also, the counter 3, if receiving the acknowledgement signal through a terminal 3*b* from the terminal 7*d* of the arbitration controller 7, stops the counting operation done until that time, and then resets the count value. In addition, even under this condition, the counter 3 outputs the count value to the comparators 4-1, 4-2.

The comparators 4-1, 4-2 compare the count value Z1 inputted from the counter 3 with predetermined values C1, C2, respectively, and if judging that the count value Z1 is greater, output True signals to the terminals 7b, 7c of the arbitration controller 7, respectively, and in the other cases, output False signals to the terminals 7b, 7c of the arbitration controller 7, respectively. Incidentally, the predetermined values C1, C2 are defined as C1≠C2. For example, in a case of C1<C2, if the count value of the counter 3 is continuous, the True signal is firstly outputted from the comparator 4-1 at a timing when the count value Z1 exceeds the predetermined value C1. Moreover, the True signal is outputted also from the comparator 4-2 at a timing when the count value Z1 exceeds the predetermined value C2. Thus, the arbitration controller 7 can grasp the time until the input of the acknowledgement signal for acknowledging the acquisition of the bus 8, after the encoding section 1 transmits the request signal for requesting the acquisition of the bus 8, on the basis of patterns (combinations) of the signals inputted to the terminals 7b, 7c from the comparators 4-1, 4-2. In addition, although in the following explanation it is presupposed that C1<C2, it is however possible to have C1>C2.

The configuration of a decoding section 2 will be described below.

A bit stream input section 42 of the decoding section 2 stores in turn the inputted encoded signals in the external memory 9 via the bus 8. At this time, the bit stream input section 42 requests a decoding control section 41 to acquire the bus 8. In response to this request, the bit stream input section 42, if receiving a report of an acknowledgement indicative of the acquisition of the bus 8 from the decoding control section 41, instructs the external memory 9 to execute the predetermined process via the bus 8.

A decoding process section 43 reads out the encoding signals stored in the external memory 9 from the bit stream input section 42 and outputs to a motion compensation section 44. At this time, the decoding process section 43, after storing the once-decoded I-picture or P-picture in the external memory 9, again reads out from the external memory 9 in order to use for the prediction of the P-picture and the B-picture. Also, the decoding process section 43 outputs the information of a motion vector or a prediction mode included in the inputted encoding signal to the motion compensation section 44. Then, based on this information, it uses motion compensation prediction information generated by the motion compensation section 44 and then decodes the picture. At this time, the decoding process section 43 requests the decoding control section 41 to acquire the bus 8. In response to this request, the decoding process section 43, if receiving the report of the acknowledgement indicative of the acquisition of the bus 8 from the decoding control section 41, instructs the external memory 9 to execute the predetermined process via the bus 8.

Based on the information of the prediction mode, the motion vector and the decoding image inputted from the decoding process section 43, the motion compensation section 44, if the prediction mode is a motion compensation prediction mode, generates the motion compensation prediction information, and performs a motion compensation prediction on the decoded image, and then outputs to the decoding process section 43, and also outputs the image inputted from the decoding process section 43 to an image output section 45. In detail, the motion compensation section 44, once storing the image inputted from the decoding process section 43 in the external memory 9 via the bus 8, stores it so that it can be read out from the external outputting unit 45. At this time, the motion compensation section 44 requests the decoding control section 41 to acquire the bus 8. In response to this request, the motion compensation section 44, if receiving the report of the acknowledgement indicative of the acquisition of the bus 8 from the decoding control section 41, instructs the external memory 9 to execute the predetermined process via the bus 8.

The image output section 45 reads out in turn the decoding images stored in the external memory 9 via the bus 8 and outputs as the output images. At this time, the image output section 45 requests the decoding control section 41 to acquire the bus 8. In response to this request, the image output section 45, if receiving the report of the acknowledgement indicative of the acquisition of the bus 8 from the decoding control section 41, instructs the external memory 9 to execute the predetermined process via the bus 8.

The decoding control section 41 controls the entire operation of the decoding section 2 and, if the bit stream input section 42, the decoding process section 43, the motion compensation section 44 or the image output section 45 requests to acquire the bus 8, outputs the request signal (Request) for requesting the bus acquisition from a terminal 41a to a terminal 5a of a counter 5 and a terminal 7g of the arbitration controller 7. Also, if the acquisition of the bus 8 is admitted in response to this request, it receives an acknowledgement signal (Acknowledge) transmitted from a terminal 7f of the arbitration controller 7 at a terminal 41b, and if receiving this acknowledgement signal, it outputs the report indicative of the acquisition of the bus 8 to the bit stream input section 42, the decoding process section 43, the motion compensation section 44 or the image output section 45, and instructs to execute the various processes.

The counter 5 is similar to the counter 3. In other words, the counter 5, if receiving the request signal for requesting the acquisition of the bus 8 inputted from the decoding section 2 from the terminal 5a, counts values at a predetermined temporal interval and outputs that count value Z2 to comparators 6-1, 6-2. Also, the counter 5, if receiving the acknowledgement signal through a terminal 5b from the arbitration controller 7, stops the counting operation done until that time, and then resets the count value Z2. Incidentally, even under this condition, the counter 3 outputs the count value to the comparators 6-1, 6-2.

The comparators 6-1, 6-2 are similar to the comparators 4-1, 4-2. In other words, the comparators 6-1, 6-2 compare the count value Z2 inputted from the counter 5 with the predetermined values C1, C2, respectively, and if judging that the count value Z2 is greater, output the True signals to terminals 7h, 7i of the arbitration controller 7, respectively, and in the other cases, output the False signals to the terminals 7h, 7i of the arbitration controller 7, respectively. Incidentally, the predetermined values C1, C2 are defined as C1≠C2. For example, in the case of C1<C2, if the count value Z2 of the counter 5 is continuous, the True signal is firstly outputted from the comparator 6-1 at a timing when the count value Z2 exceeds the predetermined value C1. Moreover, the True signal is outputted from the comparator 6-2 at a timing when the count value Z2 exceeds the predetermined value C2. Thus, the arbitration controller 7 can grasp the time until the input of the acknowledgement signal for acknowledging the acquisition of the bus 8, after the decoding section 2 transmits the request signal for requesting the acquisition of the bus 8, on the basis of patterns of the signals which are inputted to the terminals 7h, 7i and inputted from the comparators 6-1, 6-2.

Based on the request signals, which are inputted via the terminals 7e, 7g from the encoding section 1 and the decoding section 2, for requesting the acquisition of the bus 8, and the respective determination results of the comparators 4-1, 4-2, 6-1 and 6-2 inputted from the terminals 7b, 7c, 7h and 7i, the arbitration controller 7 adjusts which of the encoding section 1 and the decoding section 2 acquires the bus 8, and if admitting the acquisition, outputs the acknowledgement signal from the terminals 7d, 7f and then allows any module of the encoding section 1 and the decoding section 2, which transmits the acknowledgement signal, to acquire the bus 8, and establishes the condition in which a data can be written to and read out from the external memory 9. Also, the arbitration controller 7 has a built-in memory 7a, stores the information of the module for which the acquisition of the bus 8 is admitted, and uses that information in determining the acquisition of the bus 8 Based on the round-robin method, and then carries out the adjustment so that the module in which the timing when the bus 8 is acquired immediately before is the oldest can acquire the bus 8. In other words, it carries out the adjustment so that in the case of the two modules of the encoding section 1 and the decoding section 2, if the module acquiring the bus 8 immediately before is the encoding section 1, the decoding section 2 can acquire the bus 8, and on the contrary, if the decoding section 2 acquires the bus immediately before, the encoding section 1 can acquire the bus 8.

In addition, in FIG. 2, a thick line indicates the flow of data. A chain line indicates a route when the arbitration controller 7 transmits and receives the data of the encoding section 1 to and from the external memory 9 via the bus 8. And, a two-dot chain line indicates a route when the arbitration controller 7 transmits and receives the data of the decoding section 2 to and from the external memory 9 via the bus 8.

Figure 3:
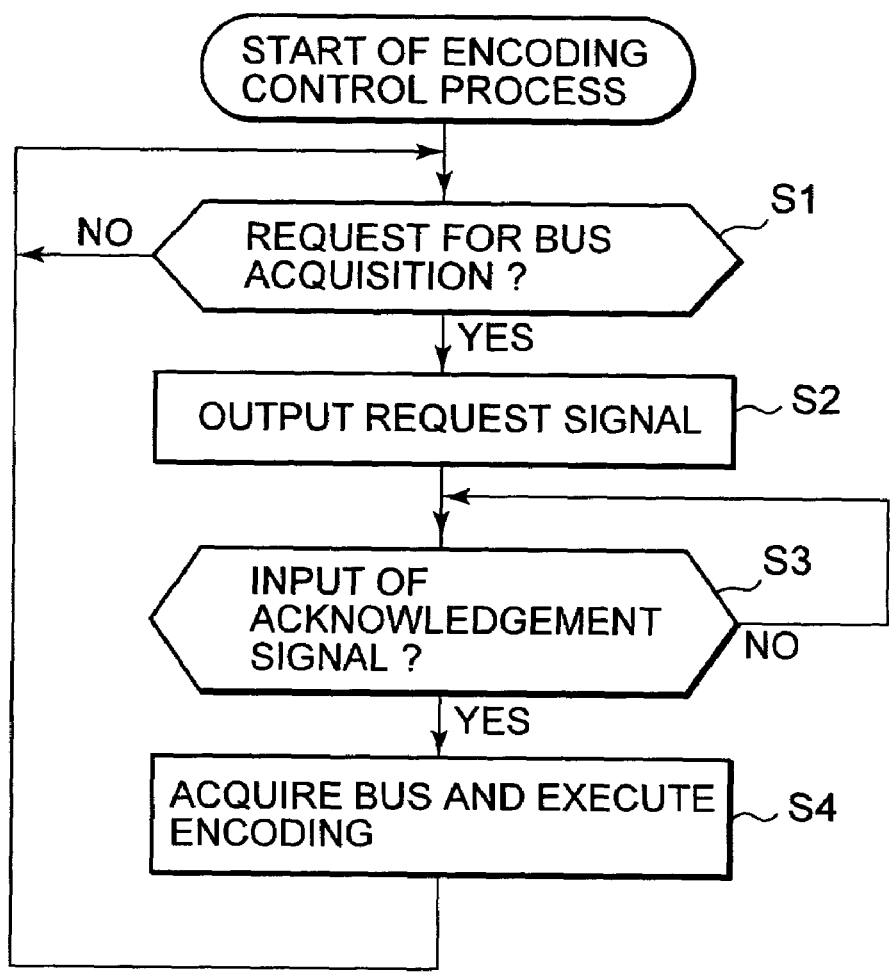
FIG. 3 is a flowchart describing an encoding control process according to an example of the preferred embodiment of the present invention.

The encoding control process of the encoding controlling section 25 will be described below with reference to a flowchart of FIG. 3.

In step S1, the encoding controlling section 25 judges (determines) whether or not any of the image input section 21, the motion prediction section 22, the encoding processor 23 and the bit stream output section 24 requests the acquisition of the bus 8, and repeats that process until any of the image input section 21, the motion prediction section 22, the encoding processor 23 and the bit stream output section 24 requests the acquisition of the bus 8. In step S1, if any among the image input section 21, the motion prediction section 22, the encoding processor 23 and the bit stream output section 24 requests the acquisition of the bus 8, the acquisition of the bus 8 is judged (determined) as requested. In step S2, the encoding controlling section 25 transmits the request signal for requesting the acquisition of the bus 8, from the terminal 25a to the terminal 3a of the counter 3 and the terminal 7e of the arbitration controller 7.

In step S3, the encoding controlling section 25 judges whether or not the acknowledgement signal is transmitted to its own terminal 25b from the terminal 7d of the arbitration controller 7. That process is repeated until the transmission of the acknowledgement signal. For example, if the acknowledgement signal is judged as transmitted, namely, if the acquisition of the bus 8 is judged as admitted, the sequence proceeds to step S4.

In step S4, the encoding controlling section 25 transmits the signal indicative of the admission of the acquisition of the bus 8 to any of the image input section 21, the motion prediction section 22, the encoding processor 23 and the bit stream output section 24, which requests the acquisition of the bus 8, and instructs to execute the various processes.

Then, the process returns to the step S1, and the processes on and after the step S1 are repeated.

Figure 4:
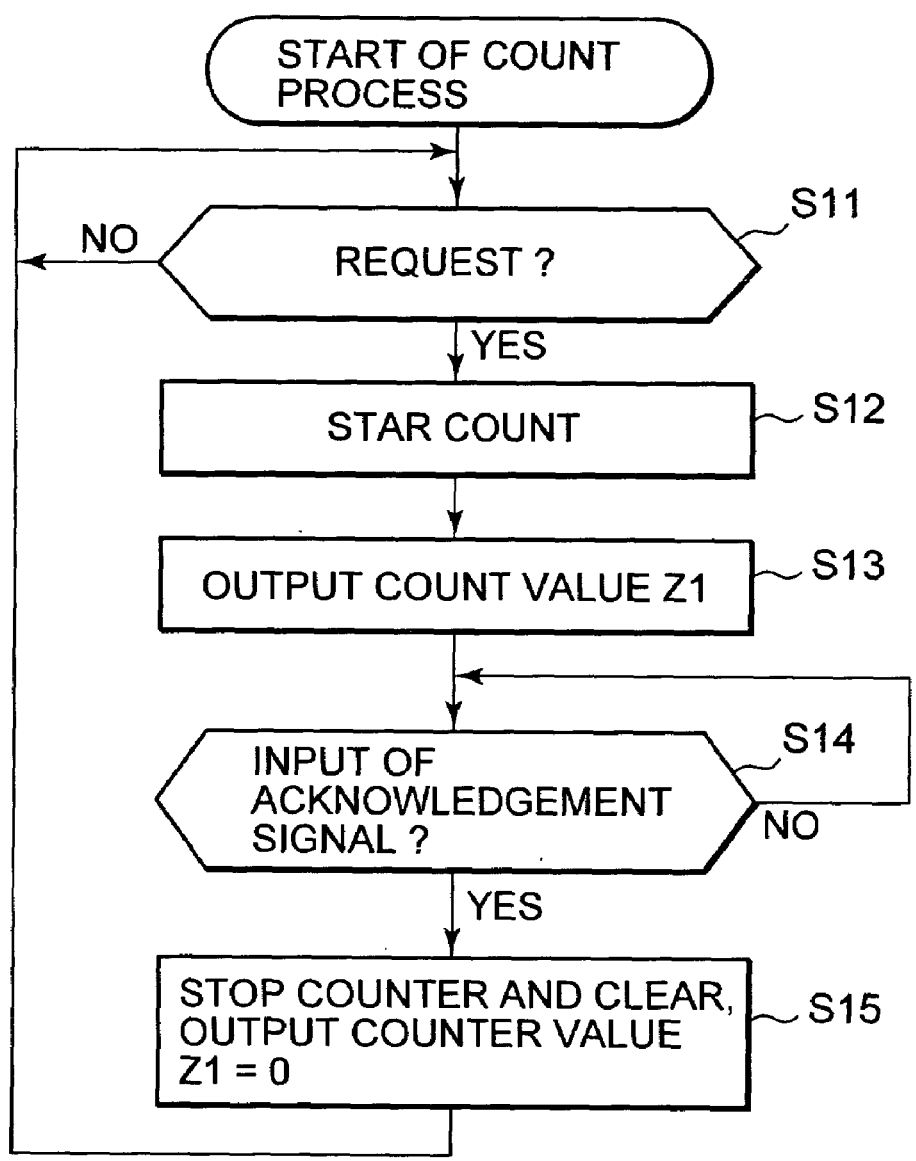
FIG. 4 is a flowchart describing a counting process according to an example of the preferred embodiment of the present invention.

The count process of the counter 3 will be described below with reference to a flowchart of FIG. 4.

In step S11, the counter 3 judges whether or not the request signal is inputted to the terminal 3a. For example, if the request signal is transmitted by the process in step S2 described with reference to the flowchart of FIG. 3, it judges that the request signal is inputted to the terminal 3a and, at step S12, the counter 3 starts counting.

In step S13, the counter 3 outputs the count value Z1 currently being counted, to the comparators 4-1, 4-2.

In step S14, the counter 3 judges whether or not the acknowledgement signal is inputted from the terminal 7d of the arbitration controller 7 to the terminal 3b. If the acknowledgement signal is judged as not inputted, the process returns to the step S13. Again, it outputs the count value Z1 currently being counted, to the comparators 4-1, 4-2. In other words, the processes in steps S13, S14 are repeated until the input of the acknowledgement signal. The count value Z1,which is always changed and counted, continues to be outputted to the comparators 4-1, 4-2.

In step S14, if the acknowledgement signal is judged as inputted from the terminal 7d of the arbitration controller 7, the counter 3 stops the counting operation continued until that time in step S15, clears the count value Z1 (sets Z1 to 0), outputs it and the process returns to step S11.

In other words, the counter 3 continues to count up the count value Z1 after the request signal is outputted from the encoding section 1 until the acknowledgement signal is inputted from the arbitration controller 7 in response to that output and, if the acknowledgement signal is inputted, the counter 3 stops the counting and clears (resets) the count value Z1.

Figure 5:
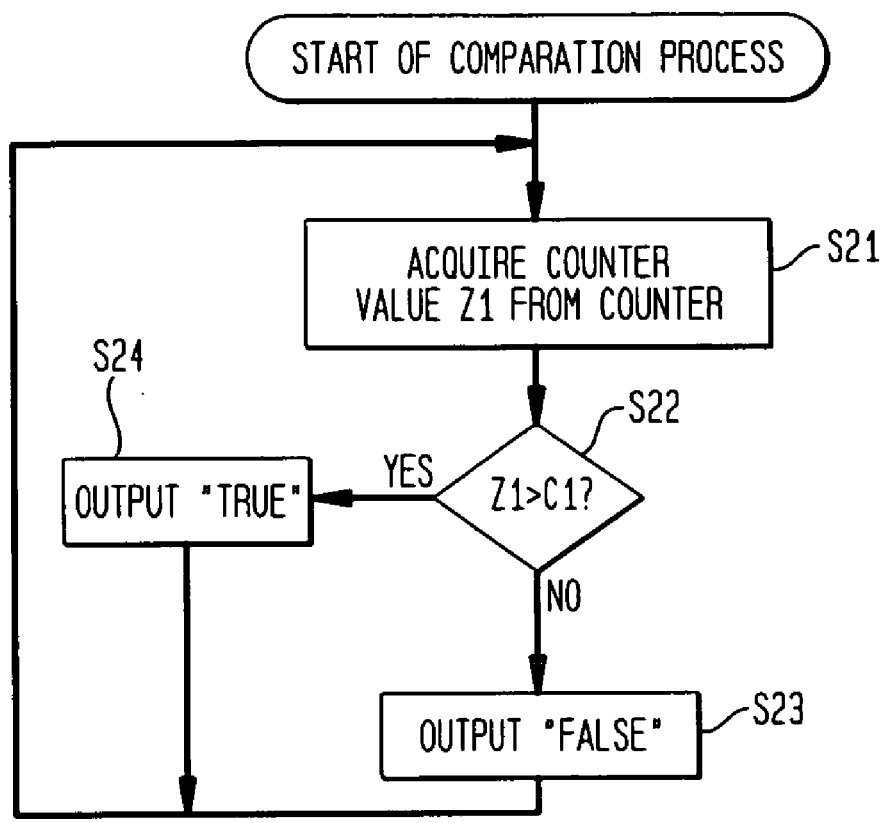
FIG. 5 is a flowchart describing a comparing process according to an example of the preferred embodiment of the present invention.

The comparing process of the comparator 4-1 will be described below with reference to a flowchart of FIG. 5.

In step S21, the comparator 4-1 acquires the count value Z1 inputted from the counter 3.

In step S22, the comparator 4-1 compares the count value Z1 acquired from the counter 3 with the predetermined value C1 and judges whether or not the count value $Z1>C1$ is established. For example, if judging that $Z1>C1$ is not established since the counting of the count value Z1 is not advanced, the comparator 4-1 outputs the False signal to the terminal 7b of the arbitration controller 7 in step S23 and the process returns to the step S21.

In step S22, the comparator 4-1, if judging that $Z1>C1$ is established, outputs the True signal to the terminal 7b of the arbitration controller 7 in step S24. The process returns to the step S21, and the processes of the step S21 and further are repeated.

In other words, when the count value Z1 of the counter 3 is counted up to the value exceeding the predetermined value C1, namely, when the latency time until the transmission of the acknowledgement signal from the arbitration controller 7 after the timing of the transmission of the request signal exceeds the time corresponding to the predetermined value C1, the True signal is inputted to the terminal 7b of the arbitration controller 7.

Similarly, the comparator 4-2 carries out the similar processes, and the True or False signal is inputted to the terminal 7c of the arbitration controller 7. However, the predetermined values C1, C2 are assumed to be $C1 \neq C2$. Thus, for example, in the case of $C1<C2$, immediately after the value of the count value Z1 exceeds C1, although the comparator 4-1 outputs the True signal, the comparator 4-2 outputs the False signal. Moreover, if the advancement of the latency time causes the count value Z1 to exceed the predetermined value C2, both of the comparators 4-1, 4-2 output the True signal. As a result, the signals in which the combination of the True and False signals inputted from the comparators 4-1, 4-2 is changed on the basis of the advancement of the count value Z1 are inputted to the arbitration controller 7.

Figure 6:
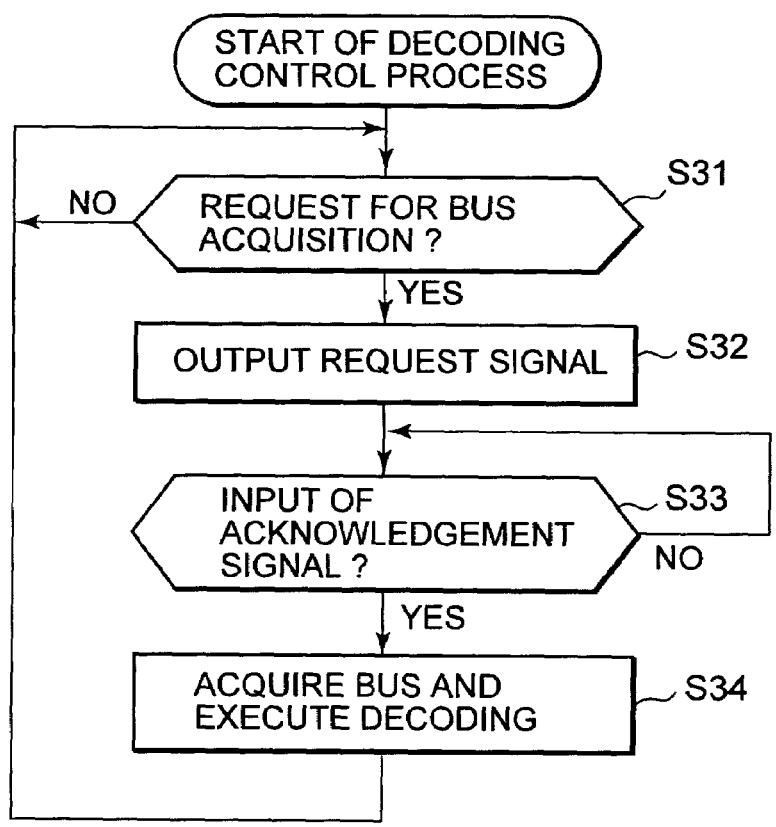
FIG. 6 is a flowchart describing a decoding control process according to an example of the preferred embodiment of the present invention.

The decoding control process of the decoding control section 41 of the decoding section 2 will be described below with reference to a flowchart of FIG. 6.

In step S31, the decoding control section 41 judges whether or not any of the bit stream input section 42, the decoding process section 43, the motion compensation section 44 and the image output section 45 requests the acquisition of the bus 8. The decoding control section 41 repeats that process until any of the bit stream input section 42, the decoding process section 43, the motion compensation section 44 and the image output section 45 requests the acquisition of the bus 8. In step S31, the decoding control section 41 judges whether the acquisition of the bus 8 is requested if any of the bit stream input section 42, the decoding process section 43, the motion compensation section 44 and the image output section 45 requests the acquisition of the bus 8. In step S32, the decoding control section 41 transmits the request signal for requesting the acquisition of the bus 8, from the terminal 41a to the terminal 5a of the counter 5 and the terminal 7g of the arbitration controller 7.

In step S33, the encoding controlling section 25 judges whether or not the acknowledgement signal is transmitted to its own terminal 41b from the terminal 7f of the arbitration controller 7, and repeats that process until the acknowledgement signal is transmitted. For example, if it judges that the acknowledgement signal is transmitted, namely, the acquisition of the bus 8 is admitted, the sequence proceeds to step S34.

In step S34, the decoding control section 41 transmits the signal indicative of the admission of the acquisition of the bus 8 to any of the bit stream input section 42, the decoding process section 43, the motion compensation section 44 and the image output section 45 which requests the acquisition of the bus 8, and instructs to execute the various processes. That process returns to step S31. Then, the processes on and after the step S31 are repeated.

In addition, the count process of the counter 5 and the comparing processes of the comparators 6-1, 6-2 are similar to the count process of the counter 3 described with reference to FIG. 4 and the comparing processes described with reference to FIG. 6, thus, the explanations thereof are omitted. However, the count value Z2 of the counter 5 is inputted to each of the comparators 6-1, 6-2. The signals leading to the compared results of the comparators 6-1, 6-2 are inputted to the terminals 7h, 7i of the arbitration controller 7.

The arbitration process of the arbitration controller 7 will be described below with reference to a flowchart of FIG. 7.

In step S51, the arbitration controller 7 judges whether or not the request signal is received from only the encoding section 1. In other words, the arbitration controller 7 judges whether or not the request signal is inputted from the encoding section 1 to the terminal 7e and whether or not the request signal is not inputted from the decoding section 2. For example, if it is judged in stepin step S51 that there is no request signal from only the encoding section 1, the sequence proceeds to step S52.

In step S52, the arbitration controller 7 judges whether or not the request signal is received from only the decoding section 2. In other words, the arbitration controller 7 judges whether or not the request signal is inputted from the decoding section 2 to the terminal 7g and whether or not the request signal is not inputted from the encoding section 1. For example, if it is judged in step S52 that there is no request signal only from the decoding section 2, the sequence proceeds to step S53.

In step S53, the arbitration controller 7 judges whether or not the request signal is received from both of the encoding section 1 and the decoding section 2. In other words, the arbitration controller 7 judges whether or not the request signal is inputted from the encoding section 1 to the terminal 7e and whether or not the request signal is inputted from the decoding section 2. For example, if it is judged in step S53 that there is no request signal from both of the encoding section 1 and the decoding section 2, the process returns to the step S51, and the processes on and after the step S51 are repeated. Since the request signal is not inputted from any module in the encoding section 1 and the decoding section 2, the processes in steps S51 to S53 are repeated.

If it is judged in step S53 that the request signals are inputted from the modules of both the encoding section 1 and the decoding section 2, in step S54, the arbitration controller 7 judges whether or not the True signal is inputted to the terminal 7b from the comparator 4-1. For example, if the True signal is judged as inputted, the sequence proceeds to step S55.

In step S55, the arbitration controller 7 judges whether or not the True signal is inputted from the comparator 4-2 to the terminal 7c. For example, if the True signal is judged as inputted, the sequence proceeds to step S56.

In step S56, the arbitration controller 7 judges whether or not the True signal is inputted from the comparator 6-1 to the terminal 7h. For example, if the True signal is judged as inputted, the sequence proceeds to step S57.

In step S57, the arbitration controller 7 judges whether or not the True signal is inputted from the comparator 6-2 to the terminal 7i. For example, if the True signal is judged as inputted, the sequence proceeds to step S58.

In step S58, the arbitration controller 7 sets priority by giving priority to a module that has not acquired the bus 8 recently, on the basis of a past record stored in the memory 7a in accordance with the round-robin method. In other words, due to the processes in steps S54 to S58, each of the encoding section 1 and the decoding section 2 continues to wait for the acknowledgement signal after outputting the request signal for the time corresponding to the predetermined value C2 or more. Thus, both of the latency times are judged as equal, and the priority rank is set on the basis of the past acquisition situation of the bus 8 without any comparison between the latency times.

In other words, in the present case, there are the two modules of the encoding section 1 and the decoding section 2. Thus, if the bus 8 is acquired by the encoding section 1 immediately before, the priority is given to the priority rank of the decoding section 2. Hence, the first priority rank is given to the decoding section 2, and the second priority rank is given to the encoding section 1. Conversely, if the bus 8 is acquired by the decoding section 2 immediately before, the priority rank of the encoding section 1 is preferentially set. Hence, the first priority rank is given to the encoding section 1, and the second priority rank is given to the decoding section 2.

In step S59, the arbitration controller 7 transmits the acknowledgement signal to the module having the highest priority rank, namely, the module having the first priority rank in accordance with the set priority rank information, and instructs to acquire the bus 8. In other words, in the case of FIG. 2, if the module having the highest priority rank is the encoding section 1, the acknowledgement signal is outputted from the terminal 7d to the encoding section 1. Conversely, if the module having the highest priority rank is the decoding section 2, the acknowledgement signal is outputted from the terminal 7f to the decoding section 2.

If it is judged in step S51 that the request signal is inputted only from the encoding section 1, in step S60, the priority is preferentially given to the encoding section 1. In other words, the fact that the request signal is received only from the encoding section 1 in step S51 does not require the arbitration, and the priority is preferentially given to the encoding section 1.

If it is judged in step S52 that the request signal is inputted only from the decoding section 2, in step S61, the priority is preferentially given to the decoding section 2. In other words, the fact that the request signal is received only from the decoding section 2 in step S52 does not require the arbitration, and the priority is preferentially given to the decoding section 2.

If it is judged in step S54 that the signal inputted to the terminal 7b from the comparator 4-1 is not True, in step S62, the arbitration controller 7 judges whether or not the signal inputted to the terminal 7g from the comparator 6-1 is True. For example, if the signal inputted to the terminal 7g from the comparator 6-1 is judged as not True, the sequence proceeds to the step S58. The priority is set in accordance with the round-robin method.

In other words, the fact that both of the judgments in steps S54, S62 are No implies that the latency times corresponding to the predetermined value C1 do not elapse after both the encoding section 1 and the decoding section 2 output the request signals, and the latency times are judged as equal. Thus, the priority is set in accordance with the round-robin method without any comparison based on the latency times.

If it is judged in step S62 that the signal inputted to the terminal 7g from the comparator 6-1 is True, the sequence proceeds to the step S62 where the priority is preferentially given to the decoding section 2. In other words, the fact that the judgment in step S54 is No and the judgment in step S62 is Yes implies that the latency time corresponding to the predetermined value C1 after the transmission of the request signal does not occur in the encoding section 1 and that the latency time corresponding to the predetermined value C1 after the transmission of the request signal occurs in the decoding section 2. Thus, the decoding section 2 has the longer latency time after the transmission of the request signal than that of the encoding section 1, hence, the priority is preferentially given to the decoding section 2.

If it is judged in step S55 that the signal inputted to the terminal 7c from the comparator 4-2 is not True, in step S63, the arbitration controller 7 judges whether or not the signal inputted to the terminal 7h from the comparator 6-1 is True. If the signal inputted to the terminal 7h from the comparator 6-1 is judged not True, the sequence proceeds to the step S60. In other words, the fact that the judgment in step S56 is No and the judgment in step S63 is No implies that the latency time equal to or longer than the time corresponding to the predetermined value C1 occurs in the encoding section 1 and that only the latency time shorter than the time corresponding to the predetermined value C1 occurs in the decoding section 2. Thus, the encoding section 1 has the longer latency time after the output of the request signal, hence, in step S60, the priority is preferentially given to the encoding section 1.

If it is judged in step S63 that the signal inputted to the terminal 7h from the comparator 6-1 is True, in step S64, the arbitration controller 7 judges whether or not the signal inputted to the terminal 7i from the comparator 6-2 is True. If the signal inputted to the terminal 7i from the comparator 6-2 is judged not True, the sequence proceeds to the step S58. In other words, the fact that the judgment in step S55 is No and the judgment in step S64 is No implies that the latency time until the time corresponding to the predetermined value C1 after the transmission of the request signal occurs in both of the encoding section 1 and the decoding section 2 and that the latency time until the time corresponding to the predetermined value C2 does not occur therein. Thus, the generated latency times are judged equal, then, the comparison between the latency times is not done and, in step S58, the priority is set in accordance with the round-robin method.

If it is judged in step S56 or S57 that the True signal is not inputted to the terminal 7h from the comparator 6-1 or the True signal is not inputted to the terminal 7i from the comparator 6-2, the sequence proceeds to the step S60. Then, the priority is preferentially given to the encoding section 1. In other words, the fact that the judgment in step S56 or S57 is No implies that although the latency time equal to or longer than the time corresponding to the predetermined value C2 occurs in the encoding section 1, the latency time shorter than the time corresponding to the predetermined value C1 (if the judgment in step S56 is No) or only the latency time shorter than the time corresponding to the predetermined value C2 occurs in the decoding section 2. Anyway, the encoding section 1 has the longer latency time than that of the decoding section 2, hence, the priority is preferentially given to the encoding section 1.

The above-mentioned processes enable the priority to be efficiently set on the basis of the latency time after the transmission of the request signal, even if there are the plurality of modules. Thus, the processing efficiency can be improved when the processes of the encoding section 1 and the decoding section 2 are executed at the timings shown in FIG. 1.

Figure 8A:
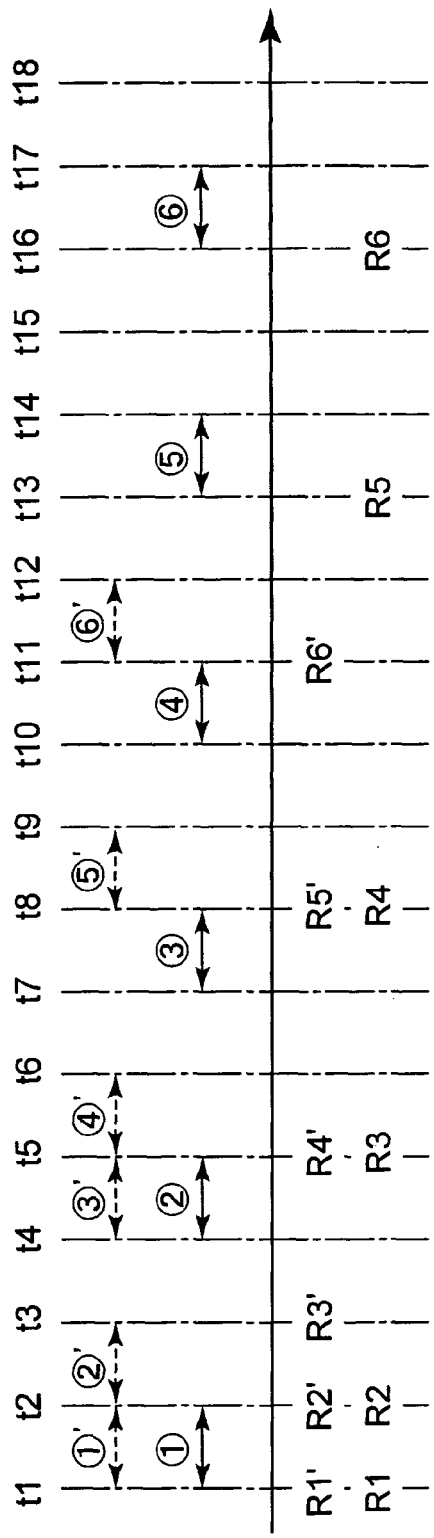
FIG. 8 is a is a schematic timing chart for describing timing process by a plurality of modules under a bus arbitration according to an example of the preferred embodiment of the present invention.
Figure 8B:
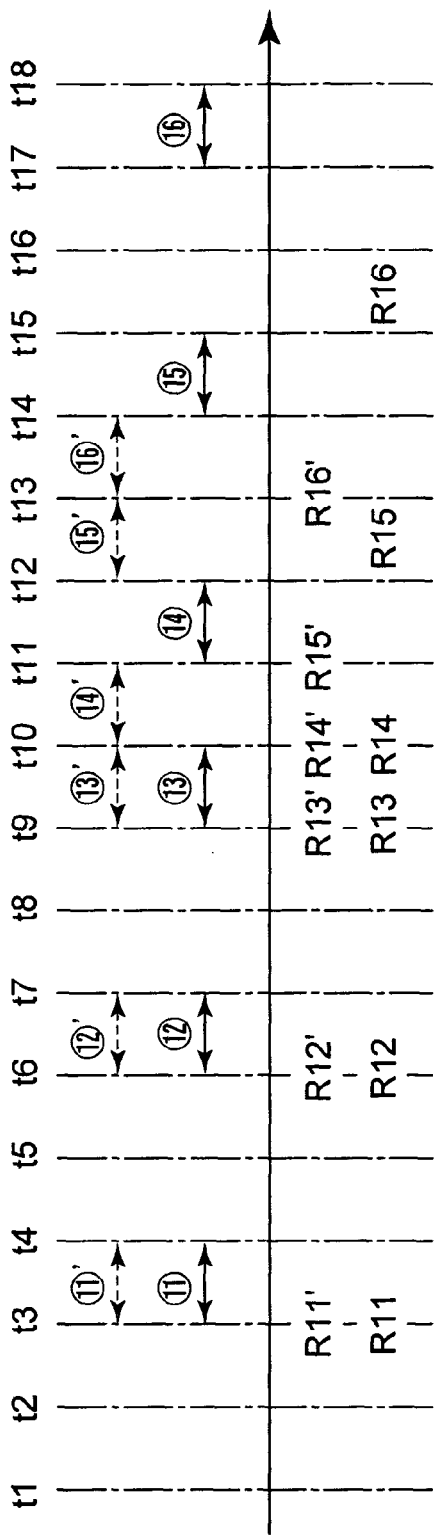

FIGS. 8A, 8B are timing charts showing the transmission timings of the request signals when the priorities are set by the above-mentioned processes to thereby adjust the acquisitions of the bus 8 for each module and the processing conditions of each module.

Also, in FIGS. 8A, 8B, for the purpose of illustration, FIG. 8A is the timing chart showing the processes of the encoding section 1, and FIG. 8B is the timing chart showing the processes of the decoding section 2. However, they are similar even if they are interchanged. Also, in FIGS. 8A, 8B, the timings indicated by the solid lines are the timing chart when the bus arbitration is done in accordance with the round-robin method, and it is similar to the timing chart shown in FIG. 1. Here, the first module indicates the encoding section 1, and the second module corresponds to the decoding section 2. Also, the timings of the processes indicated by the dotted lines are the timing chart when the bus arbitration process (the arbitration process for the bus acquisition) is done in accordance with the method described with reference to the flowchart in FIG. 7. Moreover, ['] is assigned to the process done in the bus arbitration executed in accordance with the method based on the flowchart of FIG. 7 indicated by the dotted line and the timing when the request signal is transmitted.

In other words, when a request signal R1' is transmitted at a time t1, at this time, there is only a request from the encoding section 1 (in the case in which the judgment in step S51 in FIG. 7 is Yes). Thus, the acknowledgement signal is transmitted to the encoding section 1, and a process 1' is executed. When a request signal R2' is newly transmitted at a timing of a time t2 at which the process 1' is ended, also at this time, there is only the request from the encoding section 1 (in the case in which the judgment in step S51 in FIG. 7 is Yes). Thus, the acknowledgement signal is transmitted to the encoding section 1, and a process 2' is executed. Moreover, at a time t3 at which the process 2' is ended, simultaneously with the transmission of a request signal R3' from the encoding section 1, the decoding section 2 transmits a request signal R11'. At this time, in any case, the time corresponding to the predetermined value C1 does not elapse after the transmission of the request signal (the judgment in step S54 is No, and the judgment in step S62 is No). Hence, the priority is set in accordance with the round-robin method, and the acknowledgement signal is transmitted to the decoding section 2 (since the priority is set such that the priority is given to the encoding section 1 immediately before), and a process 11' is executed. At a time t4 at which the process 11' is ended, it is only the encoding section 1 that transmits the request signal (the judgment in step S51 is Yes), hence, the acknowledgement signal is transmitted to the encoding section 1, and a process 3' is executed.

At time t5 that is the timing after the execution of the process 3', when the encoding section 1 outputs a request signal R4', the module outputting the request signal at that timing is only the encoding section 1 (the judgment in step S51 is Yes). Thus, the acknowledgement signal is transmitted to the encoding section 1, and a process 4' is executed.

At time t6 at which the process 4' is ended, the decoding section 2 outputs a request signal R12'. At this time, the module transmitting the request signal is only the decoding section 2 (the judgment in step S52 is Yes). Thus, the acknowledgement signal is transmitted to the decoding section 2, and a process 12' is executed.

At a time t8 that is delayed by two timings (the temporal difference between the time t6 and the time t8) from the time t6 when the process 4' is ended, the encoding section 1 outputs a request signal R5' (also in FIG. 1, a request signal R5 is outputted at the delay of the two timings after the process 4). At this time, the module transmitting the request signal is only the encoding section 1 (the judgment in step S51 is Yes). Thus, the acknowledgement signal is transmitted to the encoding section 1, and a process 5' is executed.

At a timing of time t9 at which the process 5' is ended, the decoding section 2 outputs a request signal R13'. At this time, the module transmitting the request signal is only the decoding section 2 (the judgment in step S52 is Yes). Thus, the acknowledgement signal is transmitted to the decoding section 2, and the process 13' is executed.

Moreover, at a time t10 at which the process 13' is ended, the decoding section 2 outputs a request signal R14'. Also at this time, the module transmitting the request signal is only the decoding section 2 (the judgment in step S52 is Yes). Thus, the acknowledgement signal is transmitted to the decoding section 2, and a process 14' is executed.

At time t11 at which the process 14' is ended, the decoding section 2 outputs a request signal R15'. At this time, the encoding section 1 outputs a request signal R6'. At this time, in both of the sections, the time corresponding to the predetermined value C1 does not elapse after the transmission of the request signal (the judgment in step S54 is No, and the judgment in step S62 is No). Thus, the priority is set in accordance with the round-robin method, and the acknowledgement signal is transmitted to the encoding section 1 (since the priority is set such that the priority is given to the decoding section 2 immediately before, and the process 14' is executed), and a process 6' is executed. At a time t12 at which the process 6' is ended, it is only the decoding section 2 that transmits the request signal (the judgment in step S52 is Yes). Hence, the acknowledgement signal is transmitted to the decoding section 2, and a process 15' is executed. Moreover, at a time t13 at which the process 15' is ended, although the decoding section 2 transmits a request signal R16', also at this time, it is only the decoding section 2 that outputs the request signal, therefore, the acknowledgement signal is transmitted to the decoding section 2, and a process 16' is executed and then the processes are ended.

Figure 1A:
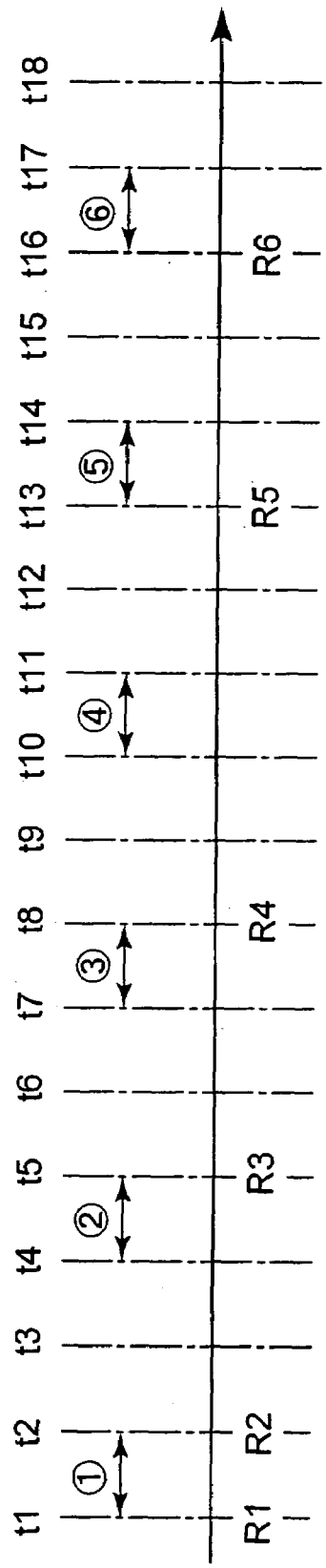
FIG. 1 is a schematic timing chart for describing timing process by a plurality of modules under conventional bus arbitration.
Figure 1B:
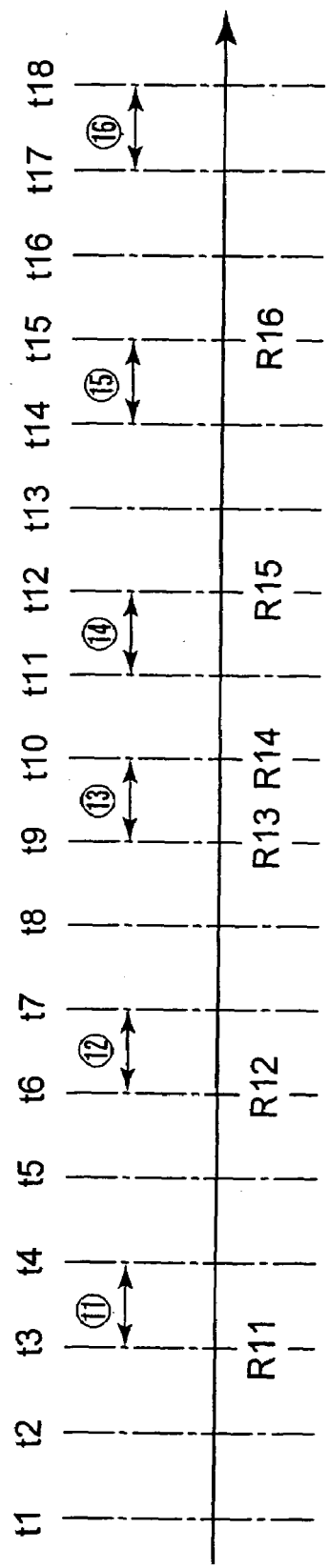

As a result, when the priority rank is designed so as to be set in accordance with the round-robin method, if both of the processes of FIGS. 1A, 1B are executed at the same time, the processing time is between the times t1 and t18 . However, according to the processes described with reference to the flowchart of FIG. 7, the processing time falls between the times t1 and t14.

As mentioned above, the bus arbitration can be efficiently performed to thereby shorten the processing time as the entire LSI. Consequently, the processing speed can be improved.

Also, in the setting method of the priority rank described with reference to the flowchart of FIG. 7, if the request signals are inputted from the plurality of modules, they are divided into the patterns of the signals inputted to the terminals 7b, 7c, 7h and 7i from the comparators 4-1, 4-2, 6-1 and 6-2.

FIG. 9 summarizes the priority ranks set for each of those patterns. Incidentally, in FIG. 9, the True signal is indicated as [1], and the False signal is indicated as [0], respectively. Also, the encoding section 1 is indicated as a module M0, and the decoding section 2 is indicated as a module M1. Moreover, the left row indicates the set condition of the priority rank. From the left, the priority ranks are represented as the first rank and the second rank. So, R (Mo,M1) indicates that the priority ranks of the modules M0, M1 are set in accordance with the round-robin method.

FIG. 9 shows that if the output signals of the comparators (Comps) 4-1, 4-2, 6-1 and 6-2 are (0,0,0,0), (1,0,1,0) and (1,1,1,1), the priority ranks are set in accordance with the round-robin method, and in a case of (1,0,0,0), (1,1,0,0) and (1,1,1,0), the module M0 is set at the first priority rank, and the module M1 is set at the second priority rank, and in a case of (1,0,1,1), (0,0,1,1) and (0,0,1,0), the module M1 is set at the first priority rank, and the module M0 is set at the second priority rank.

In addition, in the above-mentioned (*1, *2, *3 and *4), *1 represents the signal outputted from the comparator 4-1, *2 represents the signal outputted from the comparator 4-2, *3 represents the signal outputted from the comparator 6-1, and *4 represents the signal outputted from the comparator 6-2, respectively.

Thus, the arbitration controller 7 may preliminarily store those patterns as a table and transmit the acknowledgement signal to each module, namely in this case, to the encoding section 1 or the decoding section 2, on the basis of this pattern.

Also, in the above-mentioned example, the configuration example of the LSI composed of the two modules of the encoding section 1 and the decoding section 2 has been described as the modules. However, the number of the modules may be equal to or greater than it. For example, as shown in FIG. 10, the module may be composed of three LSI's.

Figure 10:
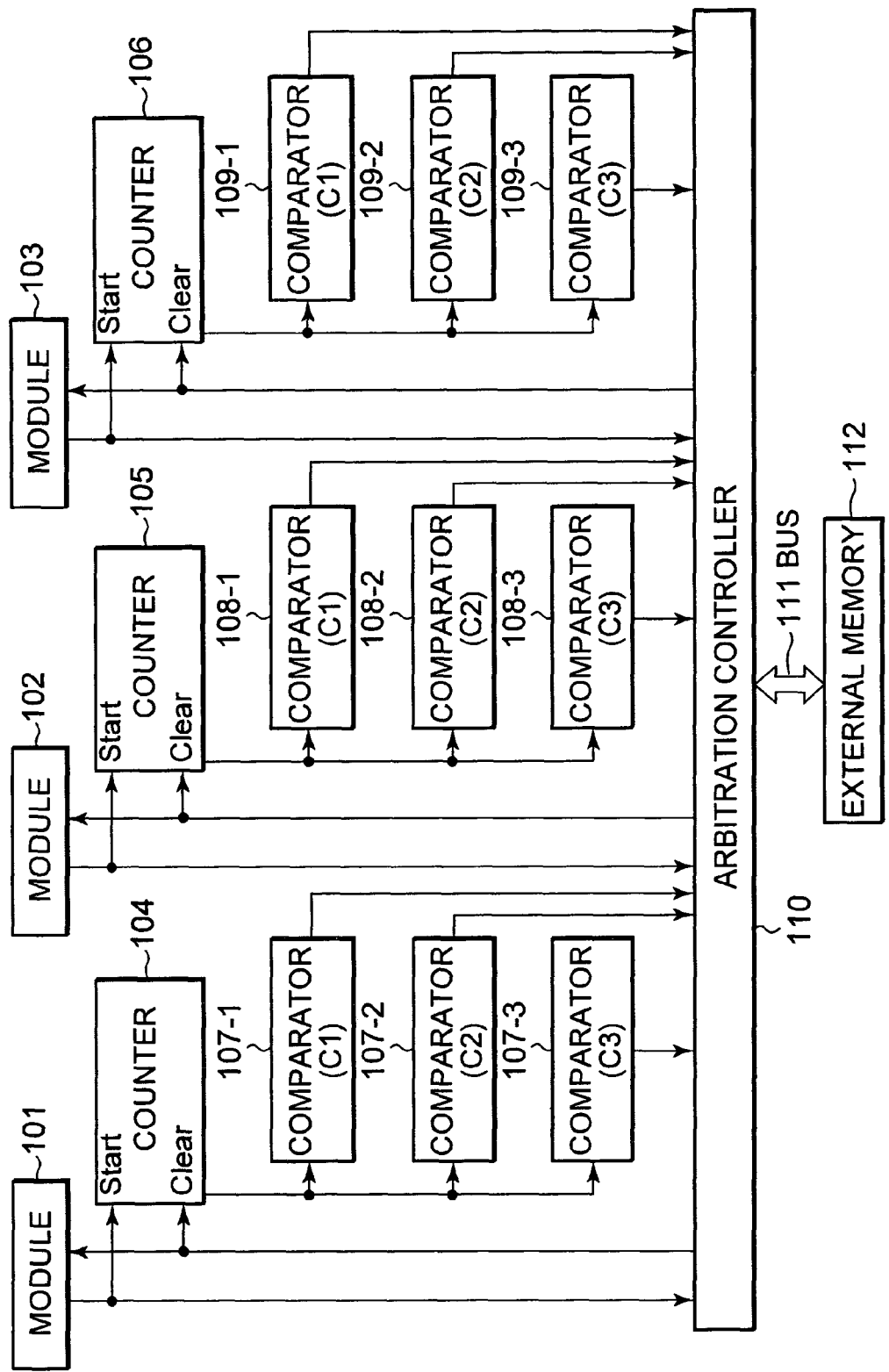
FIG. 10 is a schematic block diagram describing a configuration of a LSI having 3 modules, according to a preferred embodiment of the present invention.

In FIG. 10, modules 101 to 103 correspond to the encoding section 1 or the decoding section 2 in FIG. 2 and, hereafter, they are also referred to as modules M0 to M2. Also, counters 104 to 106 correspond to the counter 3 or 5 in FIG. 2. Moreover, comparators 107-1 to 107-3, 108-1 to 108-3, and 109-1 to 109-3 correspond to the comparators 4-1, 4-2, 6-1 or 6-2 in FIG. 2. However, in the comparators 107-1 to 107-3, 108-1 to 108-3, and 109-1 to 109-3, the comparators 107-1, 108-1 and 109-1 compare the predetermined value C1 with count values, and the comparators 107-2, 108-2 and 109-2 compare the predetermined value C2 with count values, and the comparators 107-3, 108-3 and 109-3 compare the predetermined value C3 with count values. Here, it is presupposed that C1<C2<C3. Moreover, arbitration controller 110 corresponds to the arbitration controller 7 in FIG. 2, a bus 111 corresponds to the bus 8, and an external memory 112 corresponds to the external memory 9.

In the case of such configuration, corresponding to the signals outputted from the comparators 107-1 to 107-3, 108-1 to 108-3 and 109-1 to 109-3, as shown in FIGS. 11 to 13, the arbitration controller 110 sets the priority rank, and instructs to acquire the bus 111, instructs to suitably use the external memory 112 and instructs to execute the various processes.

In other words, as shown in FIG. 11, if the output signals from the comparators 107-1 to 107-3, 108-1 to 108-3 and 109-1 to 109-3 are (0,0,0,0,0,0,0,0,0), (1,0,0,1,0,0,1,0,0), (1,1,0,1,1,0,1,1,0) and (1,1,1,1,1,1,1,1,1), the priority ranks are given to the modules M0 to M2 in accordance with the round-robin method.

Also, if the output signals from the comparators 107-1 to 107-3, 108-1 to 108-3 and 109-1 to 109-3 are (1,0,0,0,0,0,0,0,0), (1,1,0,0,0,0,0,0,0), (1,1,0,1,0,0,1,0,0), (1,1,1,0,0,0,0,0,0), (1,1,1,1,0,0,1,0,0) and (1,1,1,1,1,0,1,1,0), the first rank is given to the module M0, and the second rank and the third rank are given to the modules M1, M2, in accordance with the round-robin method.

Moreover, if the output signals from the comparators 107-1 to 107-3, 108-1 to 108-3 and 109-1 to 109-3 are (0,0,0,1,0,0,1,0,0), (0,0,0,1,1,0,1,1,0), (0,0,0,1,1,1,1,1,1), (1,0,0,1,1,0,1,1,0), (1,0,0,1,1,1,1,1,1) and (1,1,0,1,1,1,1,1,1), the first rank and the second rank are given to the modules M1, M2 in accordance with the round-robin method, and the third rank is set as the module M0.

Also, if the output signals from the comparators 107-1 to 107-3, 108-1 to 108-3 and 109-1 to 109-3 are (1,1,0,1,0,0,0,0,0), (1,1,1,1,1,0,1,0,0), (1,1,1,1,1,0,1,1,0) and (1,1,1,1,0,0,0,0), the first rank is set as the module M0, the second rank is set as module M1, and the third rank is set as the module M2.

Moreover, if the output signals from the comparators 107-1 to 107-3, 108-1 to 108-3 and 109-1 to 109-3 are (1,1,0,0,0,0,1,0,0), (1,1,1,0,0,0,1,0,0), (1,1,1,0,0,0,1,1,0) and (1,1,1,1,0,0,1,1,0), the first rank is set as the module M0, the second rank is set as module M2, and the third rank is set as the module M1.

Also, as shown in FIG. 12, if the output signals from the comparators 107-1 to 107-3, 108-1 to 108-3 and 109-1 to 109-3 are (0,0,0,1,0,0,0,0,0), (0,0,0,1,1,0,0,0,0), (1,0,0,1,1,0,1,0,0), (0,0,0,1,1,1,0,0,0), (1,0,0,1,1,1,1,0,0) and (1,1,0,1,1,1,1,1,0), the first rank is given to the module M1, and the second rank and the third rank are given to the modules M0, M2 in accordance with the round-robin method.

Moreover, if the output signals from the comparators 107-1 to 107-3, 108-1 to 108-3 and 109-1 to 109-3 are (1,0,0,0,0,0,1,0,0), (1,1,0,0,0,0,1,1,0), (1,1,1,0,0,0,1,1,1), (1,1,0,1,0,0,1,1,0), (1,1,1,1,0,0,1,1,1) and (1,1,1,1,1,0,1,1,1), the first rank and the second rank are given to the modules M0, M2 in accordance with the round-robin method, and the third rank is set as the module M1.

Also, if the output signals from the comparators 107-1 to 107-3, 108-1 to 108-3 and 109-1 to 109-3 are (1,0,0,1,1,0, 0,0,0), (1,0,0,1,1,1,0,0,0), (1,1,0,1,1,1,0,0,0) and (1,1,0,1,1, 1,1,0,0), the first rank is set as the module M0, the second rank is set as module M1, and the third rank is set as the module M2.

Also, if the output signals from the comparators 107-1 to 107-3, 108-1 to 108-3 and 109-1 to 109-3 are (1,0,0,1,1,0, 0,0,0), (1,0,0,1,1,1,0,0,0), (1,1,0,1,1,1,0,0,0) and (1,1,0,1,1, 1,1,0,0), the first rank is set as the module M1, the second rank is set as module M0, and the third rank is set as the module M2.

Moreover, if the output signals from the comparators 107-1 to 107-3, 108-1 to 108-3 and 109-1 to 109-3 are (0,0,0,1,1,0,1,0,0), (0,0,0,1,1,1,1,0,0), (0,0,0,1,1,1,1,1,0) and (1,0,0,1,1,1,1,1,0), the first rank is set as the module M1, the second rank is set as module M2, and the third rank is set as the module M1.

Also, as shown in FIG. 13, if the output signals from the comparators 107-1 to 107-3, 108-1 to 108-3 and 109-1 to 109-3 are (0,0,0,0,0,0,1,0,0), (0,0,0,0,0,0,1,1,0), (1,0,0,1,0, 0,1,1,0), (0,0,0,0,0,0,1,1,1), (1,0,0,1,0,0,1,1,1) and (1,1,0,1, 1,0,1,1,1), the first rank is given to the module M2, and the second rank and the third rank are given to the modules M0, M1 in accordance with the round-robin method.

Moreover, if the output signals from the comparators 107-1 to 107-3, 108-1 to 108-3 and 109-1 to 109-3 are (1,0,0,1,0,0,0,0,0), (1,1,0,1,0,0,0,0,0), (1,1,1,1,1,0,0,0,0), (1,1,0,1,1,0,1,0,0), (1,1,1,1,1,1,1,0,0) and (1,1,1,1,1,1,1,1, 0), the first rank and the second rank are given to the modules M0, M1 in accordance with the round-robin method, and the third rank is set as the module M2.

Also, if the output signals from the comparators 107-1 to 107-3, 108-1 to 108-3 and 109-1 to 109-3 are (1,0,0,0,0,0, 1,1,0), (1,0,0,0,0,0,1,1,1), (1,1,0,0,0,0,1,1,1) and (1,1,0,1, 0,1,1,1), the first rank is set as the module M2, the second rank is set as module M0, and the third rank is set as the module M1.

Moreover, if the output signals from the comparators 107-1 to 107-3, 108-1 to 108-3 and 109-1 to 109-3 are (0,0,0,1,0,0,1,1,0), (0,0,0,1,0,0,1,1,1), (1,0,0,1,1,0,1,1,1) and (0,0,0,1,1,0,1,1,1), the first rank is set as the module M2, the second rank is set as module M1, and the third rank is set as the module M0.

Due to such processes, in FIG. 10, as the latency times until the transmission of the acknowledgement signal after the transmission of the request signal, a latency time S for the predetermined value C1, a latency time M for the predetermined value C2 and a latency time L for the predetermined value C3 are set. Because of C1<C2<C3, S<M<L is established. Thus, the priority ranks of the modules M0 to M2 are set on the basis of the combination of the latency times for each of the modules M0 to M2 and, the bus 111 is acquired by the module set to have the first rank among them. It is possible to carry out the arbitration so as to record and read out a data in and from the external memory 112, therefore, it is possible to execute the processes of the respective modules in the LSI efficiently as a whole. As a result, it is possible to improve the processing speed.

Furthermore, although the configuration example of the LSI in which the encoding section 1 and the decoding section 2 are set as the modules has been described in the above-mentioned examples, the modules may be elements other than those described herein. Also, although the respective modules in the LSI have been exemplified in the above-mentioned descriptions, they are not limited to the modules on the LSI, so that, for example, it may be applied to a case in which the priority ranks of the processes are set by using CPU when the processes on a program are executed.

Moreover, each of the image input section 21, the motion prediction section 22, the encoding processor 23, the bit stream output section 24, the bit stream input section 42, the decoding process section 43, the motion compensation section 44 and the image output section 45 in the configuration example of FIG. 2 may be configured as the module.

According to the above-mentioned descriptions, the priority rank of the bus to be acquired by the module is set on the basis of the length of the latency time until the transmission of the acknowledgement signal after the transmission of the request signal, thus, an appropriate priority rank can be set to thereby attain an efficient bus arbitration (the process for arbitrating the bus acquisition).

Although the above-mentioned series of processes may also be executed by using hardware, they may be executed by using software. When the series of processes is executed by using the software, a program constituting the software is installed from a recording medium in a computer built in a dedicated hardware, or, for example, a general personal computer that can execute various functions by installing the various programs, or the like.

Figure 14:
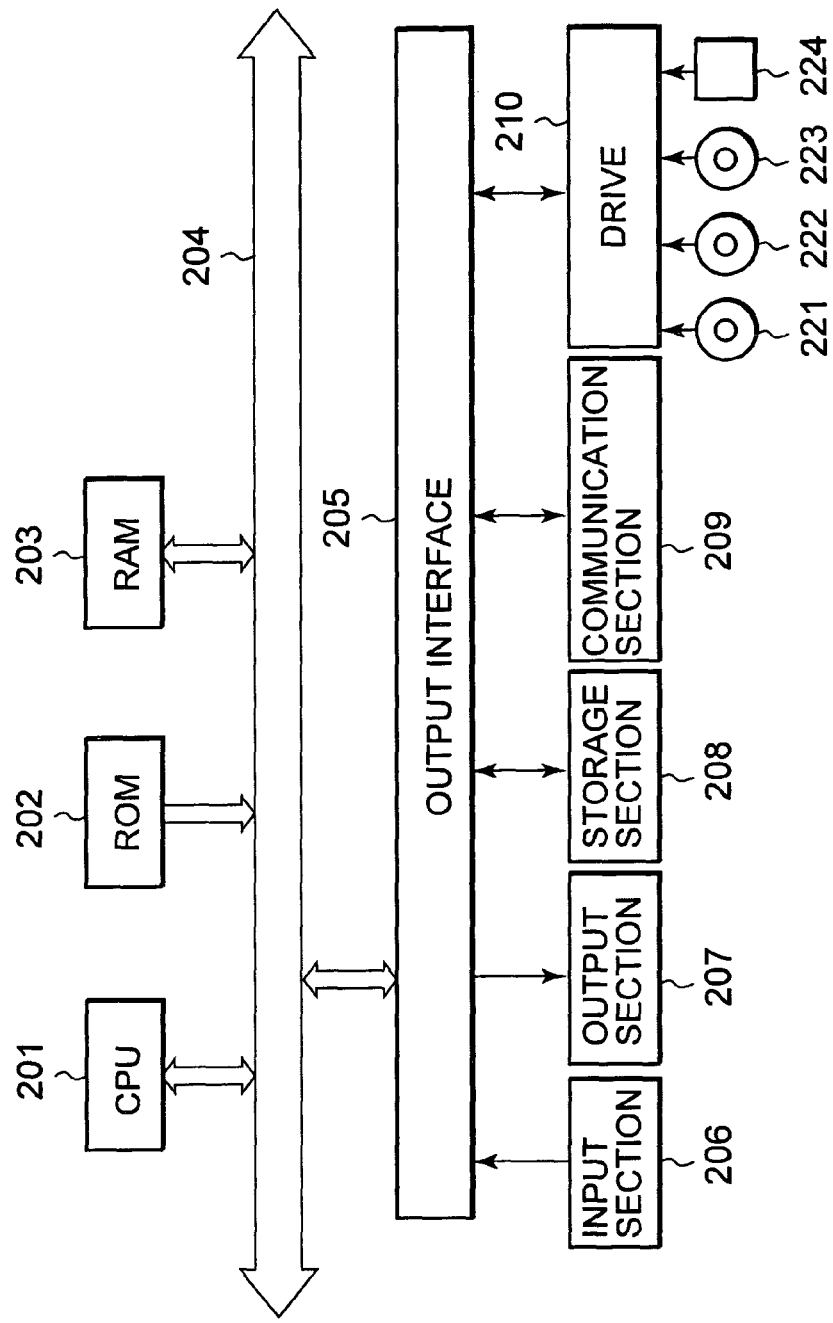
FIG. 14 is a schematic view describing a medium according to a preferred embodiment of the present invention.

FIG. 14 shows the configuration of an embodiment of a personal computer when the LSI shown in FIG. 2 is attained by each software. A CPU 201 of a personal computer controls the entire operation of the personal computer. Also, the CPU 201, if receiving a command from an input section 206 composed of a keyboard, a mouth and the like from a user through a bus 204 and an input output interface 205, executes a program stored in a ROM (Read Only Memory) 202 in response to the command. Or, the CPU 201 loads a program, which is read out from a magnetic disc 221, an optical disc 222, a magneto-optical disc 223 or a semiconductor memory 224 connected to a drive 210 and installed in a storage section 208, to a RAM (Random Access Memory) 203 and executes it. Then, an output section 207 outputs the execution result. Moreover, the CPU 201 controls a communication section 209 and communicates with an outside, and then executes an operation for transmitting and receiving a data.

The recording medium in which the program is recorded, may be constituted by the package media composed of the magnetic disc 221 (containing a flexible disc), the optical disc 222 (containing CD-ROM (Compact Disc-Read Only Memory) and DVD (Digital Versatile Disc)), the magneto-optical disc 223 (containing MD (Mini-Disc)) and the semiconductor memory 234, which are distributed to provide the program to the user and in which the program is recorded, and the like, apart from the computer, as shown in FIG. 14, and further constituted by a ROM 202 which is provided to the user in the condition preliminarily mounted in the computer and in which the program is recorded, a hard disc contained in the storage section 208, and the like.

Moreover, although in the examples of preferred embodiments of the present invention described in this specification describe the steps of a program recorded in the recording medium including the processes that are carried out in time sequence in the described order, the present invention may further include processes to be executed in parallel or individually and they do not have to be necessarily treated in time sequence.

It is therefore to be understood by those of ordinary skill in the art that any changes, variations, combinations and sub-combinations of the examples of preferred embodiments of the present invention may be practiced otherwise than as specifically described herein in the present specification without departing from the scope and spirit of the present invention.

What is claimed is:

1. An information processing apparatus, comprising:
receiving means for receiving a first request signal from a given one of a plurality of modules and a second request signal from another one of the plurality of modules, the first request signal requesting bus acquisition for the given one of the plurality of modules and the second request signal requesting bus acquisition for the another one of the plurality of modules, the given one of the plurality of modules being one of an encoder and a decoder and the another one of the plurality of modules being another of the encoder and the decoder;
measurement means for measuring a first time interval from when the first request signal is received by said receiving means and for measuring a second time interval from when the second request signal is received by said receiving means;
comparison means for comparing the measured first time interval to each of a first predetermined value and a second predetermined value and for comparing the measured second time interval to each of the first predetermined value and the second predetermined value, the second predetermined value being greater than the first predetermined value;
priority assignment means for assigning a higher priority of bus acquisition to the given one of the plurality of modules or to the another one of the plurality of modules based on a result of the comparing carried out by said comparison means; and
control means for controlling acquisition of the bus for the plurality of modules based on the assigned higher priority.

2. The information processing apparatus according to claim 1, wherein said priority assignment means assigns the higher priority using a round-robin method when either: (i) the first time interval and the second time interval are each less than the first predetermined value, (ii) the first time interval and the second time interval are each greater than the first predetermined value and less than the second predetermined value, or (iii) the first time interval and the second time interval are each greater than the second predetermined value.

3. The information processing apparatus according to claim 1, wherein said priority assignment means assigns the higher priority to the given one of the plurality of modules when either: (i) the first time interval is greater than the first predetermined value and the second time interval is less than the first predetermined value or (ii) the first time interval is greater than the second predetermined value and the second time interval is less than the second predetermined value.

4. The information processing apparatus according to claim 1, wherein said priority assignment means assigns the higher priority of bus acquisition to the another one of the plurality of modules when either: (i) the first time interval is less than the second predetermined value and the second time interval is greater than the second predetermined value or (ii) the first time interval is less than the first predetermined value and the second time interval is greater than the first predetermined value.

5. An information processing method, comprising:
receiving a first request signal from a given one of a plurality of modules and a second request signal from another one of the plurality of modules, the first request signal requesting bus acquisition for the given one of the plurality of modules and the second request signal requesting bus acquisition for the another one of the plurality of modules, the given one of the plurality of modules being one of an encoder and a decoder and the another one of the plurality of modules being another of the encoder and the decoder;

measuring a first time interval from when the first request signal is received and a second time interval from when the second request signal is received;

comparing the measured first time interval to each of a first predetermined value and a second predetermined value and comparing the measured second time interval to each of the first predetermined value and the second predetermined value, the second predetermined value being greater than the first predetermined value;

assigning higher priority of bus acquisition to the given one of the plurality of modules or to the another one of the plurality of modules based on a result of said comparing; and controlling acquisition of the bus for the plurality of modules based on the assigned higher priority.

6. The information processing method according to claim 5, wherein said step of assigning higher priority assigns the higher priority to the given one of the plurality of modules when either: (i) the first time interval is greater than the first predetermined value and the second time interval is less than the first predetermined value or (ii) the first time interval is greater than the second predetermined value and the second time interval is less than the second predetermined value.

7. The information processing method according to claim 5, wherein said step of assigning higher priority assigns the higher priority of bus acquisition to the another one of the plurality of modules when either: (i) the first time interval is less than the second predetermined value and the second time interval is greater than the second predetermined value or (ii) the first time interval is less than the first predetermined value and the second time interval is greater than the first predetermined value.

8. The information processing method according to claim 5, wherein said step of assigning priority assigns the higher priority using a round-robin method when either: (i) the first time interval and the second time interval are each less than the first predetermined value, (ii) the first time interval and the second time interval are each greater than the first predetermined value and less than the second predetermined value, or (iii) the first time interval and the second time interval are each greater than the second predetermined value.

* * * * *

UNITED STATES PATENT AND TRADEMARK OFFICE
CERTIFICATE OF CORRECTION

| | |
|---|---|
| PATENT NO. | : 7,111,098 B2 |
| APPLICATION NO. | : 10/663422 |
| DATED | : September 19, 2006 |
| INVENTOR(S) | : Hiroshi Sumihiro |

It is certified that error appears in the above-identified patent and that said Letters Patent is hereby corrected as shown below:

Column 16, line 16, "t18 ." should read --t18.--.

Column 17, line 36, "MO," should read --M0,--.

Column 18, line 16, "M1." should read --M0.--.

Signed and Sealed this

Nineteenth Day of June, 2007

JON W. DUDAS
*Director of the United States Patent and Trademark Office*